United States Patent
Stephen (10) Patent No.: US 8,914,728 B2
(45) Date of Patent: Dec. 16, 2014

(54) METHOD AND APPARATUS FOR CORRELATION OF INTERSECTIONS OF NETWORK RESOURCES

(75) Inventor: Nick Stephen, Saint Martin d'Uriage (FR)

(73) Assignee: Oracle America, Inc., Redwood City, CA (US)

( * ) Notice: Subject to any disclaimer, the term of this patent is extended or adjusted under 35 U.S.C. 154(b) by 1735 days.

(21) Appl. No.: 12/182,417

(22) Filed: Jul. 30, 2008

(65) Prior Publication Data
US 2010/0031155 A1    Feb. 4, 2010

(51) Int. Cl.
G06F 15/177 (2006.01)
H04L 12/24 (2006.01)
G06F 7/76 (2006.01)

(52) U.S. Cl.
CPC .......... *H04L 41/22* (2013.01); *H04L 41/12* (2013.01); *G06F 7/762* (2013.01)
USPC ............................. 715/736; 715/734; 715/738

(58) Field of Classification Search
CPC .......... G06F 7/762; H04L 41/22; H04L 41/12
USPC ............................. 709/224; 715/736, 734, 738
See application file for complete search history.

(56) References Cited

U.S. PATENT DOCUMENTS

| | | | | |
|---|---|---|---|---|
| 6,122,639 | A * | 9/2000 | Babu et al. | 1/1 |
| 6,442,144 | B1 * | 8/2002 | Hansen et al. | 370/255 |
| 7,240,364 | B1 * | 7/2007 | Branscomb et al. | 726/9 |
| 2002/0052960 | A1 * | 5/2002 | Trisno et al. | 709/226 |
| 2003/0220947 | A1 * | 11/2003 | Doui | 707/203 |
| 2005/0094573 | A1 * | 5/2005 | Shepard et al. | 370/254 |
| 2006/0168207 | A1 * | 7/2006 | Choong et al. | 709/224 |
| 2007/0211691 | A1 * | 9/2007 | Barber et al. | 370/351 |

* cited by examiner

*Primary Examiner* — William Bashore
*Assistant Examiner* — Gregory A Distefano
(74) *Attorney, Agent, or Firm* — Polsinelli PC (57) ABSTRACT

One particular implementation of the present invention may take the form of a method for correlating partial views of network resources into normalized or aggregated views for use by an administrator. The implementation may compare a newly detected resource against the known set of normalized resources of the network to correlate the new resource with an existing network resource. More particularly, one method for correlating network resources may compare key/value pairs associated with a new resource with key/value pairs associated with a first normalized resource. If the new resource does not correlate to the first normalized resource, the method may then compare the key/value pairs of the new resource to the key/value pairs of the second normalized resource. A second implementation may compare a unique key/value pair to a map containing the unique key/value pairs of each normalized resource, until the unique key/value pair is found. Once a normalized resource is found with the same unique key/value pair, each remaining key/value pair of the new resource may be compared with the key/value pairs of the matching normalized resource. If the key/value pairs for each resource matches, then the new resource correlates to the normalized resource.

15 Claims, 6 Drawing Sheets

METHOD AND APPARATUS FOR CORRELATION OF INTERSECTIONS OF NETWORK RESOURCES

FIELD OF THE INVENTION

Aspects of the present invention relate to management of system or network resources. More particularly, aspects of the present invention involve a method and apparatus for correlation of system or network resources to avoid presenting multiple views of the same managed resource to a system administrator.

BACKGROUND

A network is an interconnected group of computers and resources that allows communication between the resources connected to the network. Networks may be comprised of only a few network resources or up to thousands of resources all communicating over the same network. Further, communication over the network may take place even though the resources connected to the network may be located around in the world. A network may further be divided into interconnected sub-networks, with some resources having a network presence on multiple sub-networks.

Networks are generally managed and monitored by an administrator or group of administrators that structure the network and network resources to facilitate the sharing of information. To manage the network, the administrators may access and configure the various resources connected to the network. A variety of access methods exist that allow network administrators access to the different resources of the network. Some common access methods include simple network management protocol (SNMP), telnet, secure shell (SSH), intelligent platform management interface (IPMI) and command line interfaces (CLI).

Each network resource may be accessed through one, a few, or many access methods and through one or through multiple sub-networks. For example, an administrator may access a router using the SNMP management access point from any of the sub-networks to which the router is connected. The administrator may also access the same router using an SSH management access point from any of these sub-networks. Further, each management access point may provide a different set of management options for configuring the resource depending on the management access point chosen. For example, accessing the router using SNMP may provide a read-only view of the router's configuration, and provide the ability to raise asynchronous notifications when there are error conditions. However, to perform administrative changes to the router, such as powering it off, it may be necessary to use the SSH management access point of that same router. This SSH access point may provide the ability to power-down and reconfigure the router, but may not have the ability to send asynchronous notifications to the administrator about error conditions. Thus, each management access point to each resource connected to the network may provide the administrator with a different set of management options.

Each management access point to a resource may be referred to a partial view of the resource. Thus, multiple partial views of each resource connected to the network may be provided to an adminstrator or group of administrators. Each resource may be accessed through multiple management access points, thereby provided many partial views of the resource. Hence, an administrator desiring to access a resource to manage the network may be faced with multiple partial views of the resource. In addition, since each management access point may be exposed through multiple sub-networks, the number of access points to the resource are increased. Traditionally, it has been assumed that the administrator knows which view of the resource is needed to perform the desired maintenance on the network resource. For example, the administrator must know that to power down the router, he must manually log into the router rather than access the router using IPMI. In addition, traditionally, the administrator is expected to know that different views across multiple sub-networks of the same resource actually refer to the same underlying resource.

SUMMARY

As shown above, most traditional networks provide multiple partial views of the network resources to an administrator. However, it may be helpful to the administrator to provide a view of all of the unique resources connected to the network rather than a series of partial views of separate access points. One method of providing a view of all of the unique resources of a network is to correlate all partial views of a resource into a single normalized or aggregated view. Through the normalized view of the network resource, an administrator may perform the network management on each resource without having to recall which management access point is best suited for each task. Thus, what is needed is a method to correlate partial views of a network resource into a single, normalized view to assist in the management of the network.

One aspect of the present invention involves a method for managing a network. The method may include operations for detecting a new resource on a network comprising at least one existing resource and determining whether the new resource is a partial view of the at least one existing resource. Further, the method may correlate the new resource with the at least one existing resource.

Another aspect may involve a system for managing a network. The system may include a detecting module configured to detect a new resource on the network comprising at least one existing resource. The system may also include a comparing module configured to compare the new resource with the at least one existing resource to determine if the new resource is a partial view of the at least one existing resource. Further, the system may include a correlating module configured to correlate the new resource with the at least one existing resource.

DETAILED DESCRIPTION

One particular implementation of the present invention may take the form of a method for correlating partial views of network resources into normalized or aggregated views for use by an administrator. The implementation may compare a newly detected resource against the known set of normalized resources of the network to correlate the new resource with an existing network resource.

More particularly, one method for correlating network resources may compare key/value pairs associated with the network resources to determine if a new resource correlates with a normalized resource. To correlate the new resource with the set of normalized resources of the network, the key/value pairs of the new resource may be compared to the key/value pairs of the normalized resource in a linear fashion. Thus, the method may compare the key/value pairs of the new resource to the key/value pairs of the first normalized resource. If the new resource does not correlate to the first normalized resource, the method may then compare the key/value pairs of the new resource to the key/value pairs of the second normalized resource. This method may continue until a correlation of the resources is found or the new resource has been compared to every normalized resource in the network.

Another implementation may include a method to compare the key/value pairs of the new resource to the key/value pairs of the normalized resources through a sieving process. In this embodiment, a unique key/value pair of the new resource may be compared to a map containing the unique key/value pairs of each normalized resource, until the unique key/value pair is found. Once a normalized resource is found with the same unique key/value pair, each remaining key/value pair of the new resource may be compared with the key/value pairs of the matching normalized resource. If the key/value pairs for each resource matches, then the new resource correlates to the normalized resource. If the key/value pairs for the new resource do not match the key/value pairs for a normalized resource, then a new normalized resource may be created from the new resource.

Figure 1:
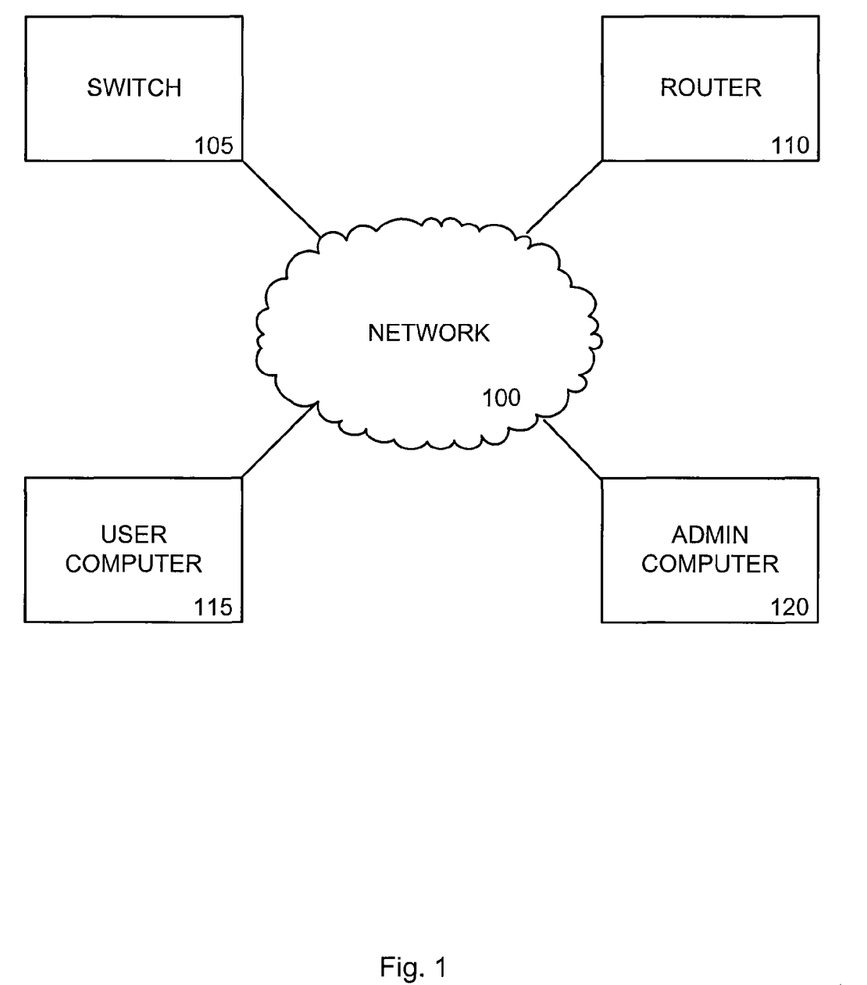
FIG. 1 is a block diagram illustrating an exemplary network.

FIG. 1 is a block diagram illustrating an exemplary network 100. The network 100 depicted includes a switch 105, a router 110, a user computer 115 and an admin computer 120. However, these components are included as mere examples of possible resources included in a network. Those skilled in the art will recognize that a network may be constructed of many different resources, including but not limited to the resources shown in FIG. 1. Network 100 allows information to be passed between the resources 105-120 connected to the network 100 in such a manner that the resources 105-120 connected to the network 100 may communicate. Networks may include anywhere from a few network resources to thousands of resources all communicating over the network.

Network 100 may be managed and monitored by an administrator or group of administrators to structure the network 100 and network resources to facilitate the sharing of information. To manage the network 100, an administrator may access the various resources connected to the network 100 to configure the flow of information. The administrator may access the resources of the network through the admin computer 120 or he may access the resources remotely by logging onto the network 100. By accessing the different resources of the network 100, the administrator may configure, allocate, deploy and coordinate the network resources 105-120 to maximize and facilitate the communication and sharing of information across the network 100. A large number of access methods exist to assist in managing the network resources. Some common access methods include, but are not limited to, simple network management protocol (SNMP), telnet, secure shell (SSH), intelligent platform management interface (IPMI) and command line interfaces (CLI). Those skilled in the art will recognize the many varied ways to access network resources, either by directly or by remotely logging into the network.

The network resources 105-120 of network 100 may be accessed through the various methods described above. For example, an administrator may access router 110 using the SNMP management access point. Similarly, an administrator may access router 110 using an IMPI management access point. Further, the router 110 may be access by directly logging into the router 110 itself to configure the router's 100 setup. Thus, each resource 105-120 connected to the network 100 may be accessed through the various managing access points described above. Further still, many resources connected to network 100 may contain multiple IP addresses that provide a different set of management access points. Thus, for example, an administrator may access switch 105 using a first IP address assigned to the switch 105 to manage the switch resource. This first IP address assigned to the switch 105 may include a set of management access points. An administrator may also access the switch 105 through a second IP address assigned to the switch 105. The second IP address may include a different set of management access points as that of the first IP address. Thus, an administrator may access switch 105 through either the first or the second IP address assigned to switch 105, depending on the type of management activity useful to the administrator.

Each management access point may provide a different set of management options depending on the management access point chosen. For example, accessing switch 105 using an SSH management access point may provide the administrator the ability to configure the flow of information through the switch 105. However, the administrator may have to log onto the switch 105 directly from the switch terminal if the administrator desires to power down the switch 105. Thus, each management access point to each resource connected to the network 100 may provide the administrator with a different set of management options.

Thus, multiple partial views of each resource connected to the network 100 may be provided. Each resource may be accessed through multiple management access points and multiple IP addresses, thereby provided many partial views of the resource. An administrator desiring to access a resource to manage the network may be faced with multiple partial views of the resource. Traditionally, it has been assumed that the administrator knows which partial view of the resource is needed to perform the desired maintenance on the network resource. However, it may be helpful to present to the administrator a view of all of the unique resources connected to the network. Thus, all of the partial views of one network resource may be aggregated together and presented to the administrator. Through this, the administrator may access the aggregated view of the resource to accomplish all necessary administrative tasks on that resource.

Figure 2:
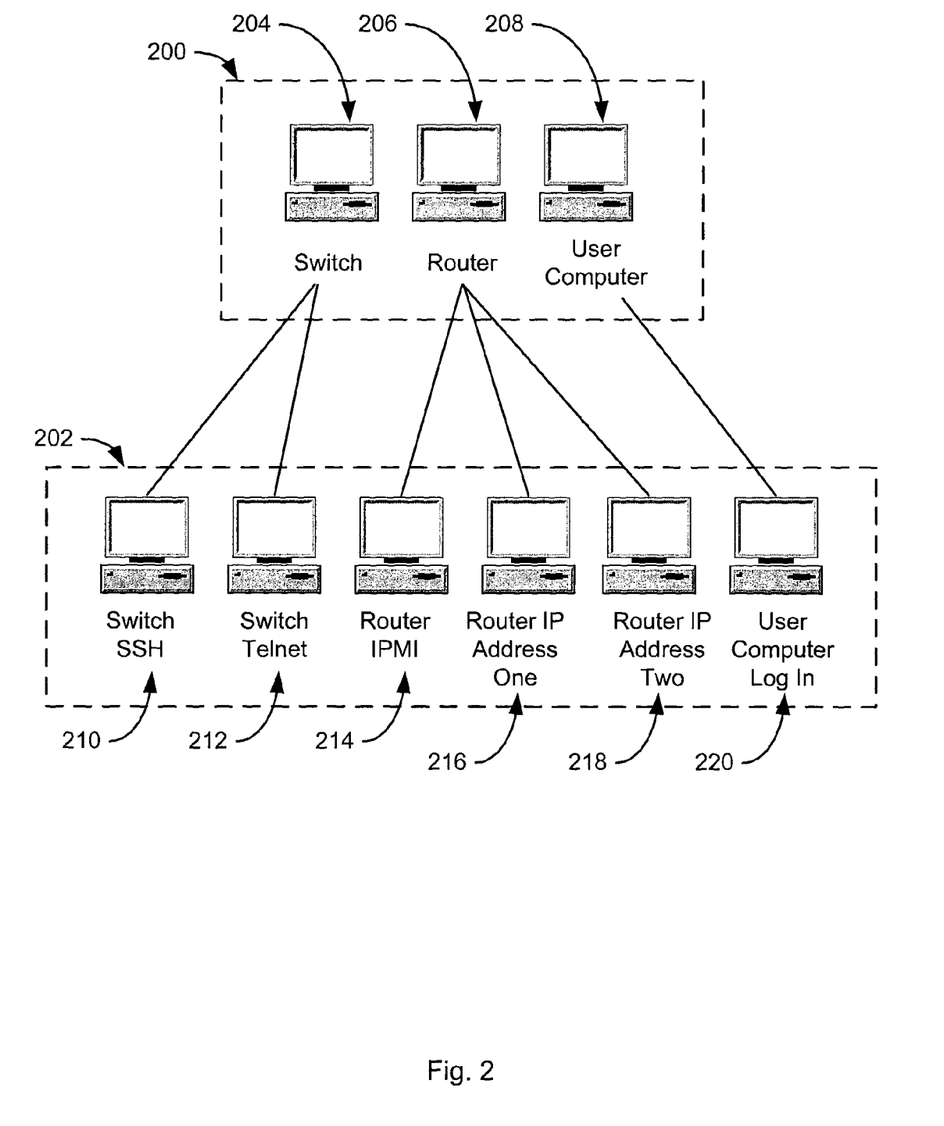
FIG. 2 illustrates multiple partial views of several network resources aggregated into unique normalized resources of a network.

FIG. 2 illustrates multiple partial views of several network resources aggregated into unique resources of the network. Box 200 includes several aggregated network resources, including a switch 204, a router 206 and a user computer 208. The aggregated, or normalized, network resources 204-208 may be connected to a network and managed by an administrator to facilitate the sharing of information between the resources 204-208 as described above.

Box 202 includes several partial views of network resources 204-208. Switch SSH 210 represents a management access point for switch resource 204 using a SSH access point. Switch telnet 212 represents a management access point for switch resource 204 using a telnet access point. Router IPMI 214 represents a management access point to router 206 using an IPMI access point. Router IP address one 216 represents the management access point of router 206 through a first IP address assigned to the router 206. Router IP address two 218 represents the management access point of router 206 through a second IP address assigned to the router 206. User computer log-in 220 represents the management access point of user computer 208 by logging into user computer 208. The partial views of network resources 204-208 depicted in box 202 represent a few of the many possible partial views possible for the network resources 204-208 shown.

As stated above, it may be helpful to present to the administrator of a network a single, unique view for all of the network resources rather than presenting all of the partial views of the network resources. Thus, partial views switch SSH 210 and switch telnet 212 may be aggregated together to present switch resource 204 to the administrator. Thus, the administrator may be presented with a normalized switch resource 204 to perform management tasks on the switch 204 through both management access points provided, namely SSH and telnet. In this manner, the administrator may perform all management tasks of the switch resource provided by SSH and telnet without having to access the separate partial views of the switch resource 204. Similarly, partial views router IPMI 214, router IP address one 216 and router IP address two 218 may be aggregated together to present router resource 206 to the administrator. The administrator may be presented with the normalized router resource 206 to access the router connected to the network through the IPMI management access point provided as well as through both IP addresses assigned to the router resource 206. In this manner, the administrator may perform all management tasks of the router resource 206 provided by the network without having to access the separate partial views of the router resource 206. By providing normalized resources 204-208 of the network resources, the administrator may manage the network without having to be aware of which partial view of the resource provides which management options. Instead, each normalized resource 204-208 may include all available management choices for that resource.

Figure 3:
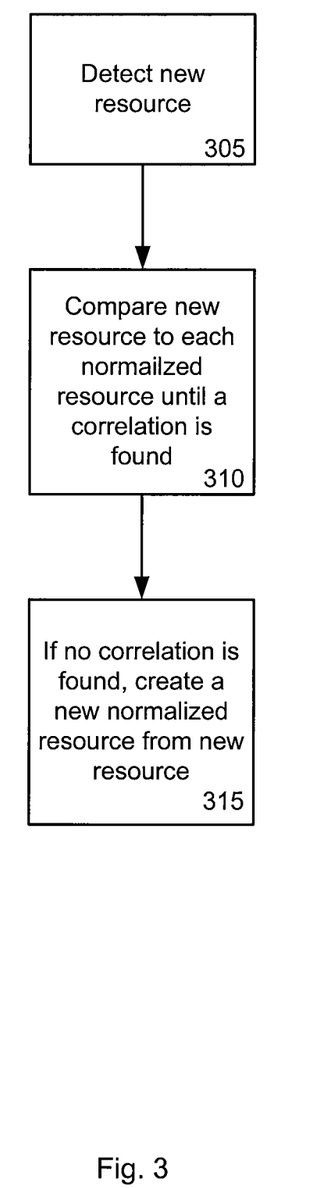
FIG. 3 is a flow chart illustrating a first embodiment that correlates partial views of network resources into a single normalized view for that resource.

To present normalized views of each network resource to the administrator, correlation of each partial view of a single network resource may take place. FIG. 3 is a flow chart illustrating a first embodiment that correlates partial views of network resources into a single normalized view for that resource. The normalized view of the network resource may include all of the available management access points for that resource.

The embodiment may begin in operation 305 when a new resource is detected. The detected resource may be a physical addition to the network, such as a new switch or router added to the network, or the new resource may be a newly discovered partial view of an existing resource of the network. For example, a partial view of an existing resource may be discovered when an administrator pings all of the known network addresses using the separate methods to access a resource, such as telnet or SSH. Through this discovery process, a new partial view of an existing network resource that was previously unknown may be found. Similarly, a new partial view may also be declared by the administrator. For example, an administrator may prevent access to a network resource through a particular access point. However, it may become useful to open that access point to the resources based on network usage. Thus, the administrator may open the access point to the resource and declare the access point open to the rest of the network. Thus, a new partial view of a network resource may be detected.

Figure 4:
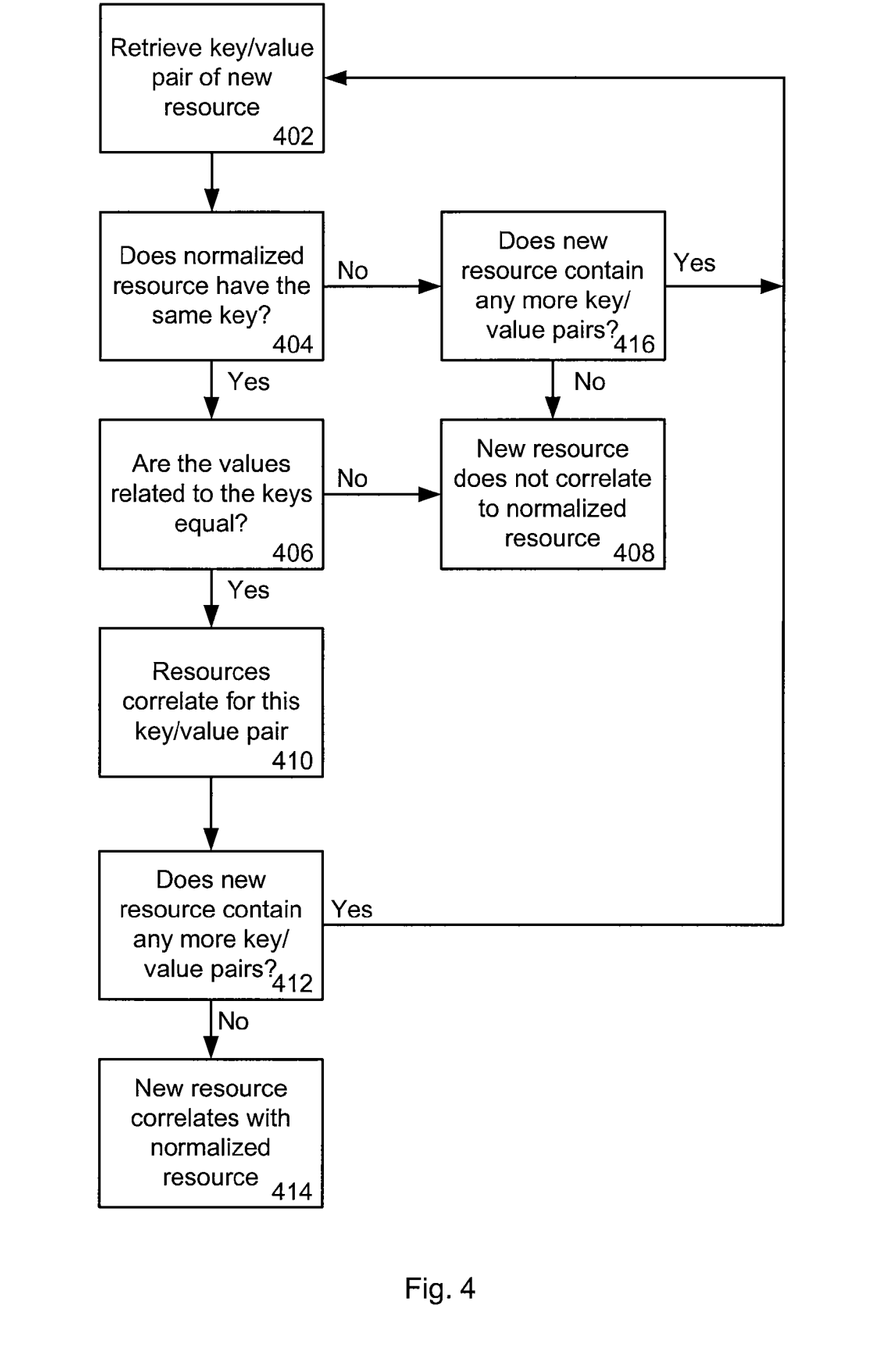
FIG. 4 is a flow chart illustrating a second embodiment correlating network resources in a linear fashion.
Figure 5:
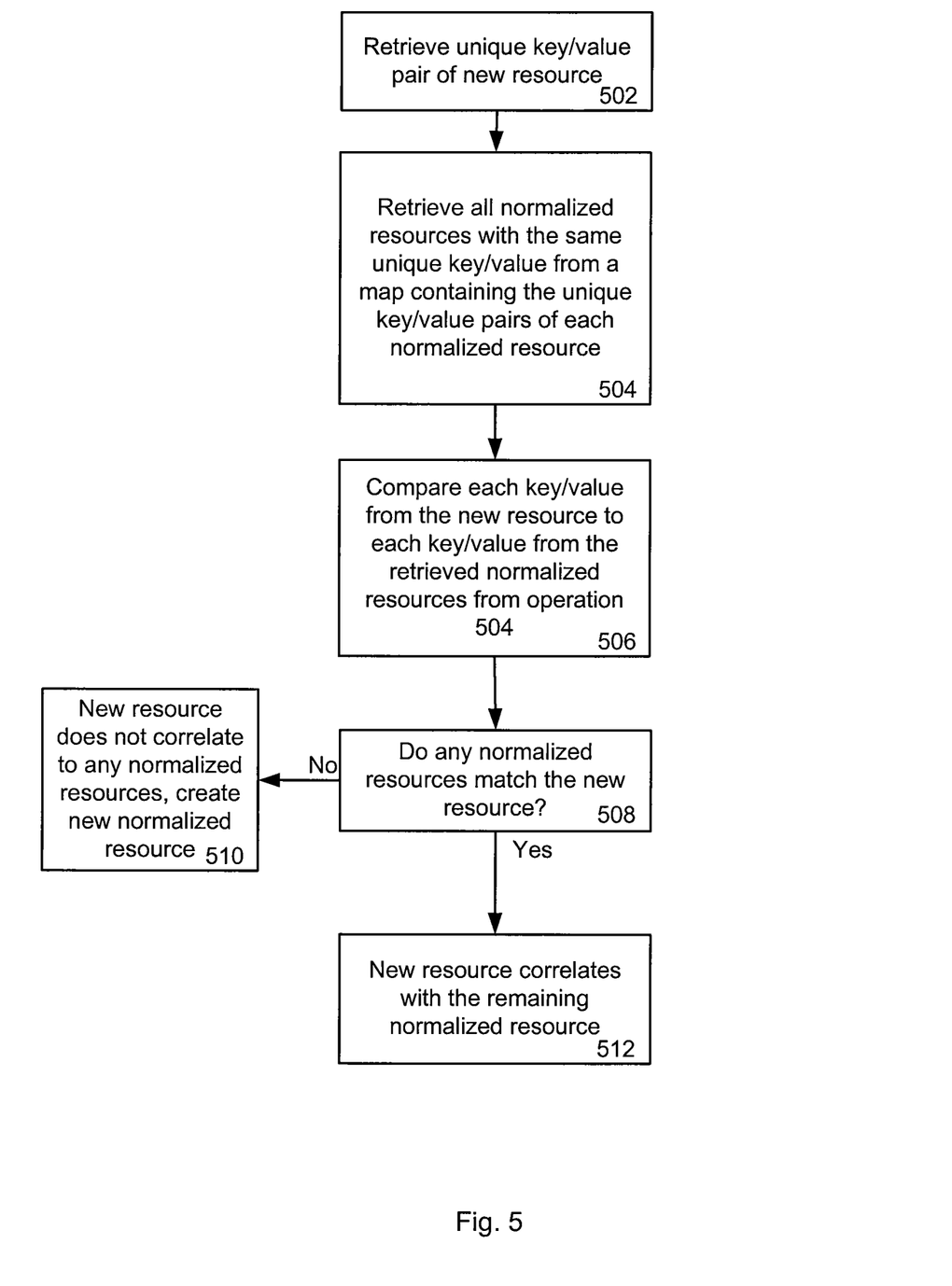
FIG. 5 is a flow chart illustrating a third embodiment correlating network resources using sieving techniques.

Once a new partial view of a network resource is detected, the new resource may be compared to each existing normalized resource of the network until a correlation is found in operation 310. Embodiments of methods to compare the new resource to the existing normalized resources of the network are depicted in FIG. 4 and FIG. 5. In general, any method that provides a way for the new resource to be compared to the normalized resources of the network to correlate the new resource with a normalized resource is envisioned.

In one embodiment, a collection of key/value pairs describing features of the new resource may be compared to a group of key/value pairs describing features of the normalized resource. For example, the new resource may have a key/value pair describing what device type of the new resource. Thus, the new resource may have a key/value pair of device type/router. This key/value pair may be compared to a similar key/value pair of the normalized resource. For example, the normalized resource may also contain key/value pair of device type/router. Other key types may include IP addresses, serial numbers or Ethernet MAC addresses. In general, any feature of the resources may be used as a key to compare the features of the network resources. By comparing multiple key/value pairs associated with the new resource to each normalized resource, it may be determined that the new resource correlates with an existing normalized resource and the new resource may then be merged into the normalized resource.

If, after comparing the new resource to the normalized resources, a correlation between the resources is not found in operation 310, then the new resource may be a new addition to the network. In this case, a new normalized resource may be created from the newly detected resource in operation 315. Through the method depicted in FIG. 3, newly detected resources may be correlated to existing normalized resources to provide an administrator with normalized views of all of the network resources.

FIG. 4 is a flow chart illustrating a second embodiment for correlating network resources in a linear fashion. The flow chart of FIG. 4 may depict one embodiment of operation 310 of FIG. 3. The flow chart of FIG. 4 may compare a new resource against each normalized resource of the network individually until a correlation is found or a new normalized resource is created.

Beginning in operation 402, a key/value pair associated with the new resource may be retrieved. For example, the detected new resource may have a key/value pair of device type/operating system (OS). After the key/value pair is retrieved, a normalized resource of the network may be scanned to determine if the normalized resource has a similar key in operation 404. Continuing the above example, a normalized resource of the network may be scanned to determine whether the normalized resource has a device type key associated with it. If the normalized resource does not have a similar key, then it may be determined if the new resource includes any more key/value pairs in operation 416. If the new resource does not have any more key/value pairs associated with it, then none of the key/value pairs associated with the new resource match with the key/value pairs associated with the normalized resource and the new resource may not correlate to the normalized resource, as shown in operation 408. However, if the new resource has more key/value pairs associated with it, the next key/value pair may be retrieved in operation 402.

If the normalized resource has a similar key when scanned in operation 404, the values associated with the matching keys may be compared in operation 406. If the values associated with the matching keys are not equal, then the new resource may not correlate with the normalized resource, as shown in operation 408. If the values do match, the new resource and the normalized resource correlate for that key/value pair in operation 410. Continuing the above example, if the normalized resource has a device type/OS key/value pair associated with it similar to that of the key/value pair of the new resource, then the new resource and the normalized resource correlate for this key/value pair.

If it is determined in operation 408 that the new resource and the normalized resource may not correlate, then the new resource may then be compared to the next normalized resource beginning again in operation 402. In this manner, the flow chart depicted in FIG. 4 may be performed for every normalized resource in the network, until a correlation between the new resource and a normalized resource is found. After a correlation is found, the new resource may be merged into the normalized resource to present a normalized view to an administrator that includes the new partial view.

Assuming that the key/value pair of the new resource and the normalized resource match in operation 410, it may be determined whether any more key/value pairs are associated with the new resource in operation 412. If key/value pairs associated with the new resource remain, the next key/value pair associated with the new resource is retrieved in operation 402 and the comparison of that key/value pair to the normalized resource is conducted as described above. Continuing the above example, assume that both the new resource and the normalized resource have a key/value pair device type/OS associated with them. After determining the key/value pairs correlate in operation 410, it may be determined if the new resource has any remaining key/value pairs in operation 412. Assume the new resource has a second key/value pair, IP address/172.16.254.1. This key/value pair may be retrieved in operation 402 and the above operations may compare the second key/value pair against a similar key/value pairs associated with the normalized resource. These operations may continue until all key/value pairs associated with the new resource have been compared with the key/value pairs of the normalized resources.

If it is determined that all of the key/value pairs associated with the new resource has been compared to the normalized resource in operation 412, then it may be assumed that the new resource and the normalized resource correlate in operation 414. Thus, it may be assumed that the new resource is a partial view of the normalized resource and that the partial resource may then be merged into the normalized resource for presentation to an administrator. Further, once a correlation is found for the new resource, the embodiment may cease searching through the normalized resources for a correlation.

As stated above, the above operations may be performed for every normalized resource of the network until a correlation is found or it is determined that the new resource cannot be correlated and a new normalized resource is created. Thus, the above operations must be performed on an order of n^2 (O(n^2)) times for each new resource detected on the network, with n being the number of new resources detected on the network. A more efficient embodiment to compare the new resource with the existing normalized resources of the network is depicted in FIG. 5.

FIG. 5 is a flow chart illustrating a third embodiment correlating network resources using sieving techniques. The flow chart of FIG. 5 may depict an embodiment of operation 310 of FIG. 3. The flow chart of FIG. 5 may compare a new resource against each normalized resource of the network collectively using a unique key/value pair of the new resource until a correlation is found or a new normalized resource is created. A unique key/value pair is one that is likely to be associated with only one normalized resource. For example, a key/value pair of type/server may be shared by many resources on the network, presumably every server of the network. On the other hand, a key/value pair of a serial number or MAC address is likely to be unique to only one resource on the network. However, because each management access point may provide a different unique key/value pair for a normalized resource, it may not be possible to use the same unique key/value pair for every new resource to compare to the unique key/value pairs of the normalized resources. Therefore, a map containing all unique key/value pairs for every normalized resource on the network may be maintained to provide such information during correlation.

Beginning in operation 502, a unique key/value pair associated with the new resource may be retrieved. For example, the detected new resource may have a unique key/value pair of serial number/12345. In operation 504, a map containing the unique key/value pairs of the normalized resources may be accessed to determine each normalized resource with the same unique key/value pair. Thus, if the retrieved key/value pair equals serial number/12345, a map of all normalized resources may be accessed to determine all of the matching normalized resources with serial number/12345.

In operation 506, each remaining key/value pair of the new resource may then be compared with the key/value pairs of the determined normalized resources. In the above example, the remaining key/value pairs of the new resource may be compared with each normalized resource found to have a unique key/value pair of serial number/12345.

If none of the remaining normalized resources match in operation 508, than it may be assumed that no normalized resource correlates with the new resource in operation 510. In this case, a new normalized resource may be created and the new resource may be merged into the created new normalized resource.

If one of the normalized resources matches the new resource in operation 508, than the new resource may correlate with the remaining normalized resource in operation 512. Because all key/value pairs of the new resource have been compared to the list of possible normalized resources correlations, only one normalized resource should remain. Once a correlation with a normalized resource is found, the new resource may be merged with the normalized resource for presentation to an administrator.

Because the operations depicted in FIG. 5 are performed once for every key/value pair associated with the new resource, the number of operations performed is the number of key/value pairs associated with the new resource. Thus, because the number of key/value pairs associated with any resource is likely small, the operations depicted in FIG. 5 may require much less processing power to complete when compared with other embodiments and can be determined in a constant time O(1) whatever the size of the set of already correlated resources, rather than in O(n^2) time.

Figure 6:
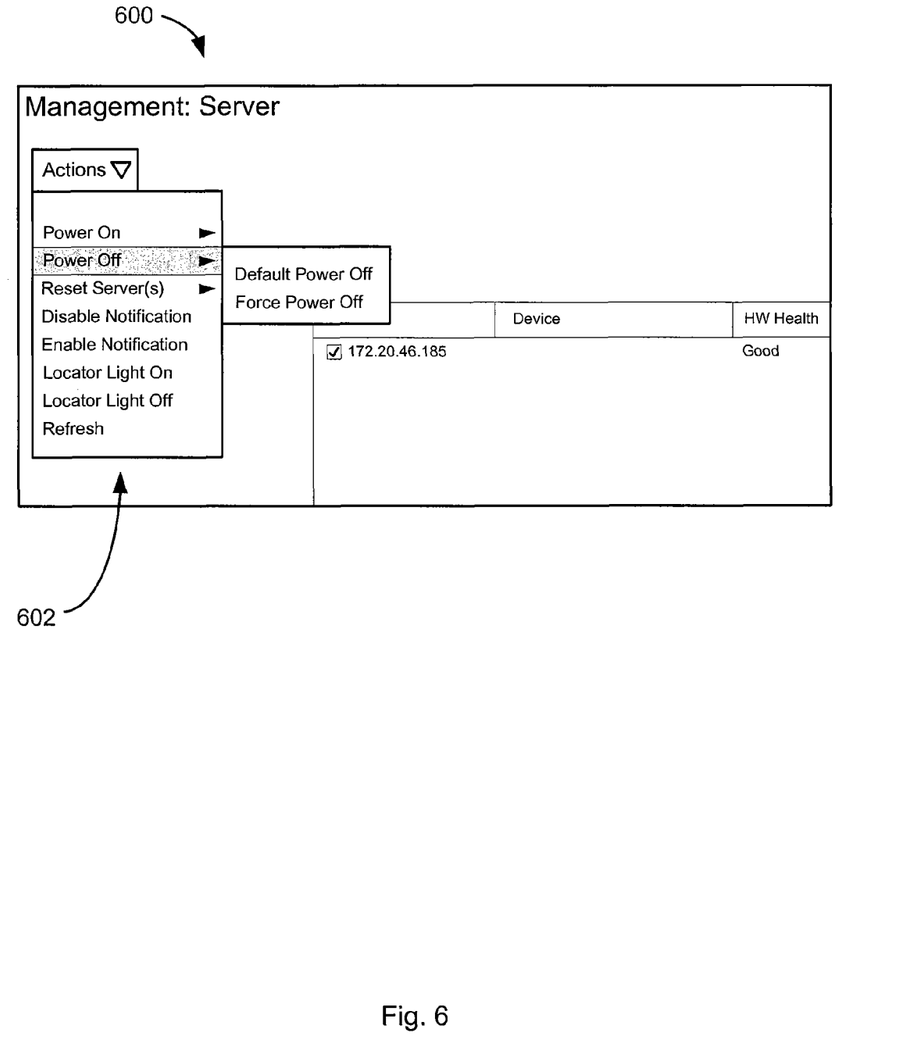
FIG. 6 is a screenshot of an exemplary interface provided to an administrator for managing a network resource.

FIG. 6 is a screenshot of an exemplary interface provided to an administrator for managing a network resource. As explained above, the normalized resource may be presented to a user or administrator so that the user may manage the network resources. The normalized resource may include all of the partial views of the resource that has been detected on the network. Further, each partial view of the resource may present the user with a separate set of management actions that may be taken on the resource to configure and manage the network.

The screenshot 600 presented in FIG. 6 shows one possible interface that a user may use to manage the network resources. The screenshot 600 depicts the management of a normalized server resource located on a network. The normalized server resource may include a set of actions that a user may perform to configure the server, as shown in drop-down menu 602. The normalized view of each resource presented to the user may contain actions that are specific to each normalized resource, depending on the type of device and partial views of the resource that have been detected.

As new partial views of the server shown in the screenshot 600 are detected as explained above, a new list of actions available to the user for configuring the server may be presented. Each newly detected partial view may provide a set of new actions that may be utilized by a user to configure the server. Thus, while the instance of the normalized resource presented to the user may not change as new partial views are detected on the network, the correlated partial views may provide new capabilities to manage the normalized resource. These new capabilities may be presented in the drop-down menu 602 as the partial views of the network resource are correlated with the normalized view. Through the detection and correlation of partial views, the available actions to manage the normalized network resources may be built.

Although depicted as a drop-down menu style interface in screenshot 600, the user interface displaying the normalized resources to the user may take many forms. For example, the normalized view may be a list of possible actions that may be taken on the resource, with certain items grayed out or missing if some capabilities are not available for that resource. Further, each normalized resource may be presented as icons to the user. Those skilled in the art will recognize the various methods to present a user with a user interface to manage a network.

It should be noted that the flowcharts of FIG. 3-5 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for managing a network, the method comprising:
    detecting a new resource on a network comprising a plurality of existing resources, wherein each of the plurality of existing resources comprises a plurality of key/value pairs associated with an identifying feature of the existing resource, including at least one unique key/value pair;
    creating a map of the at least one unique key/value pair for each of the plurality of existing resources of the network;
    determining whether the new resource is a partial view of the at least one existing resource by comparing only one unique key/value pair of a plurality of key/value pairs associated with the new resource to the map of the at least one unique key/value pair for each of the plurality of existing resources and, in the event that the unique key/value pair associated with the new resource matches one of the key/value pair associated with one of the plurality of existing resources of the network, comparing each remaining key/value pair of the plurality of key/value pairs associated with the new resource to each remaining key/value pair of the plurality of key/value pairs associated with the one of the plurality of existing resources of the network; and
    correlating the new resource with the at least one existing resource as a management access point for the at least one existing resource.

2. The method of claim 1 further comprising:
    correlating the new resource with the at least one existing resource in the event the new resource is a partial view of the at least one existing resource, the partial view of the at least one existing resource including a newly detected access point; and
    generating a new normalized resource view of the new resource in the event that the new resource is not a partial view of the at least one existing resource of the network.

3. The method of claim 1 wherein the correlating operation further comprises:
    merging the partial view of the at least one existing resource with a normalized view of the at least one existing resource; and
    providing the merged normalized view of the at least one existing resource to a network user through a user interface, wherein the network user may access the normalized view of the at least one existing resource through the user interface to alter the configuration of the at least one existing resource on the network to manage the network.

4. The method of claim 3 wherein the normalized view of the at least one existing resource includes at least one access point to manage the at least one existing resource and the partial view of the at least one existing resource includes a newly detected access point to manage the at least one existing resource.

5. The method of claim 4 wherein the merged normalized view of the at least one existing resource includes the at least one access point to manage the at least one existing resource and the newly detected access point to manage the at least one existing resource.

6. The method of claim 5 wherein the network user may manage the at least one existing resource on the network by altering the configuration of the at least one existing resource through the access points included in the merged normalized view of the at least one existing resource presented to the network user through the user interface.

7. The method of claim 1 further comprising:
    matching the plurality of key/value pairs associated with the new resource to a plurality of key/value pairs associated with a second one of the plurality of existing resources of the network in the event that the key/value pairs associated with the new resource do not match the plurality of key/value pairs associated with the first one of the plurality of existing resources of the network.

8. The method of claim 1, in the event that the unique key/value pair of the plurality of key/value pairs associated with the new resource does not match with any key/value pairs associated with the plurality of existing resources of the network, further comprising:
    creating a new normalized resource from the new resource.

9. A system for managing at least one resource of a network, the system comprising:
    a computer comprising one or more processors;

a detecting module configured to detect a new resource on the network comprising at a plurality of existing resources, wherein each of the plurality of existing resources comprises a plurality of key/value pairs associated with an identifying feature of the existing resource, including at least one unique key/value pair;

a comparing module configured to compare the new resource with the at least one existing resource to determine if the new resource is a partial view of the at least one existing resource by comparing only one unique key/value pair of a plurality of key/value pairs associated with the new resource to a map of the at least one unique key/value pair for each of the plurality of existing resources of the network and, in the event that the unique key/value pair associated with the new resource matches one of the key/value pair associated with one of the plurality of existing resources of the network, comparing each remaining key/value pair of the plurality of key/value pairs associated with the new resource to each remaining key/value pair of the plurality of key/value pairs associated with the one of the plurality of existing resources of the network;

a correlating module configured to correlate the new resource with the at least one existing resource as a management access point for the at least one existing resource.

10. The system of claim 9 wherein the correlating module is further configured to:

correlate the new resource with the at least one existing resource in the event the new resource is a partial view of the at least one existing resource, the partial view of the at least one existing resource including a newly detected access point; and generate a new normalized resource view in the event that the new resource is not a partial view of the at least one existing resource of the network.

11. The system of claim 9 further comprising:

a user interface module configured to present access points of the at least one existing resource of the network to a network user, wherein the access points allow the network user to alter the configuration of the at least one existing resource of the network to manage the network.

12. The system of claim 11 wherein the correlating module is further configured to:

merge the partial view of the at least one existing resource with a normalized view of the at least one existing resource.

13. The system of claim 12 wherein the normalized view of the at least one existing resource includes at least one access point to manage the at least one existing resource and the partial view of the at least one existing resource includes a newly detected access point to manage the at least one existing resource.

14. The system of claim 13 wherein the merged normalized view of the at least one existing resource includes the at least one access point to manage the at least one existing resource and the newly detected access point to manage the at least one existing resource.

15. The system of claim 14 wherein the user interface module is further configured to:

provide the merged normalized view of the at least one existing resource to the network user through the network interface, wherein the network user may access the normalized view of the at least one existing resource through the user interface to alter the configuration of the at least one existing resource on the network to manage the network.

* * * * *

UNITED STATES PATENT AND TRADEMARK OFFICE
CERTIFICATE OF CORRECTION

PATENT NO. : 8,914,728 B2  
APPLICATION NO. : 12/182417  
DATED : December 16, 2014  
INVENTOR(S) : Stephen Page 1 of 1

It is certified that error appears in the above-identified patent and that said Letters Patent is hereby corrected as shown below:

In the Specification,

In column 1, line 62, delete "adminstrator" and insert -- administrator --, therefor.

In column 4, line 8, delete "IMPI" and insert -- IPMI --, therefor.

In the Claims,

In column 11, line 2, in Claim 9, delete "at a" and insert -- a --, therefor.

Signed and Sealed this  
Fourth Day of August, 2015

Michelle K. Lee  
*Director of the United States Patent and Trademark Office*